United States Patent [19]

Malone et al.

[11] 4,354,484
[45] Oct. 19, 1982

[54] SOLAR COLLECTION SYSTEM

[75] Inventors: Kenneth B. Malone; Joseph A. Grow, Jr., both of Chattanooga, Tenn.

[73] Assignee: Transolar, Inc., Hixson, Tenn.

[21] Appl. No.: 222,316

[22] Filed: Jan. 5, 1981

[51] Int. Cl.³ ............................................. F24J 3/02
[52] U.S. Cl. ................................... 126/425; 126/438; 126/451; 353/3
[58] Field of Search ............... 250/491; 126/417, 424, 126/425, 438, 439, 451, 419, 452; 353/3

[56] References Cited

U.S. PATENT DOCUMENTS

| | | | |
|---|---|---|---|
| 4,153,038 | 5/1979 | McDonald | 126/425 |
| 4,187,834 | 2/1980 | Hoinski | 126/425 |
| 4,192,289 | 3/1980 | Clark | 126/438 |
| 4,195,775 | 4/1980 | Pitts | 126/438 |
| 4,205,661 | 6/1980 | Chapman | 250/491 |
| 4,235,222 | 11/1980 | Ionescu | 126/438 |
| 4,242,580 | 12/1980 | Kaplow | 126/425 |
| 4,267,441 | 5/1981 | Monk | 126/425 |
| 4,296,737 | 10/1981 | Silk | 126/438 |
| 4,297,572 | 10/1981 | Carlton | 126/425 |
| 4,314,546 | 2/1982 | Miller | 126/425 |

*Primary Examiner*—Daniel J. O'Connor
*Attorney, Agent, or Firm*—Alan Ruderman

[57] ABSTRACT

A solar energy collection system for receiving and collecting a concentrated supply of available energy from the sun includes a reflector having an internal structural frame covered by a thin deformable film at the front and a membrane cover enclosing the remainder of the structure. The front film has a reflective surface deformable into the desired configuration by the creation of a partial vacuum within the reflector. The reflector is driven by a two axis tracking mechanism directed by controls including a microprocessor programmed with data providing the position of the sun. The sun's rays are reflected from the reflective surface into an absorber through which working fluid circulates and which has a low radiation loss tube matrix design. The tubes are supported from a heat exchanger plate at one end of the absorber by means of rods carried by the plate which trap a beaded lip at the end of the tubes. Various safety and efficiency interrupts/overrides are incorporated into the controls to forestall or to terminate tracking and return the reflector to a stored position when, for example, there is insufficient solar insolation and/or excessive wind at the reflector location.

4 Claims, 18 Drawing Figures

| | |
|---|---|
| 12 A | |
| 12 B | |
| 12 C | |
| 12 D | |
| 12 E | |
| 12 F | |

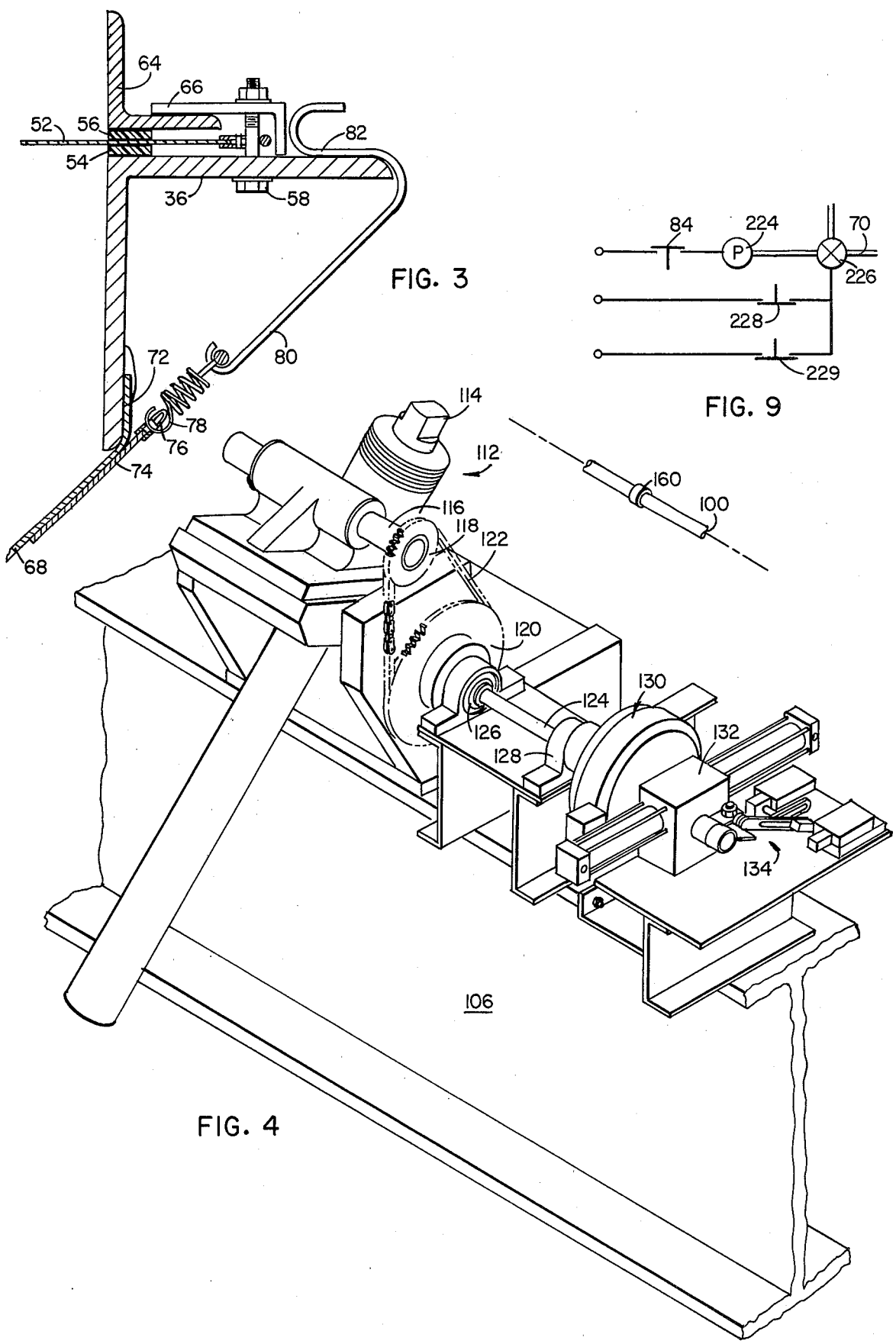

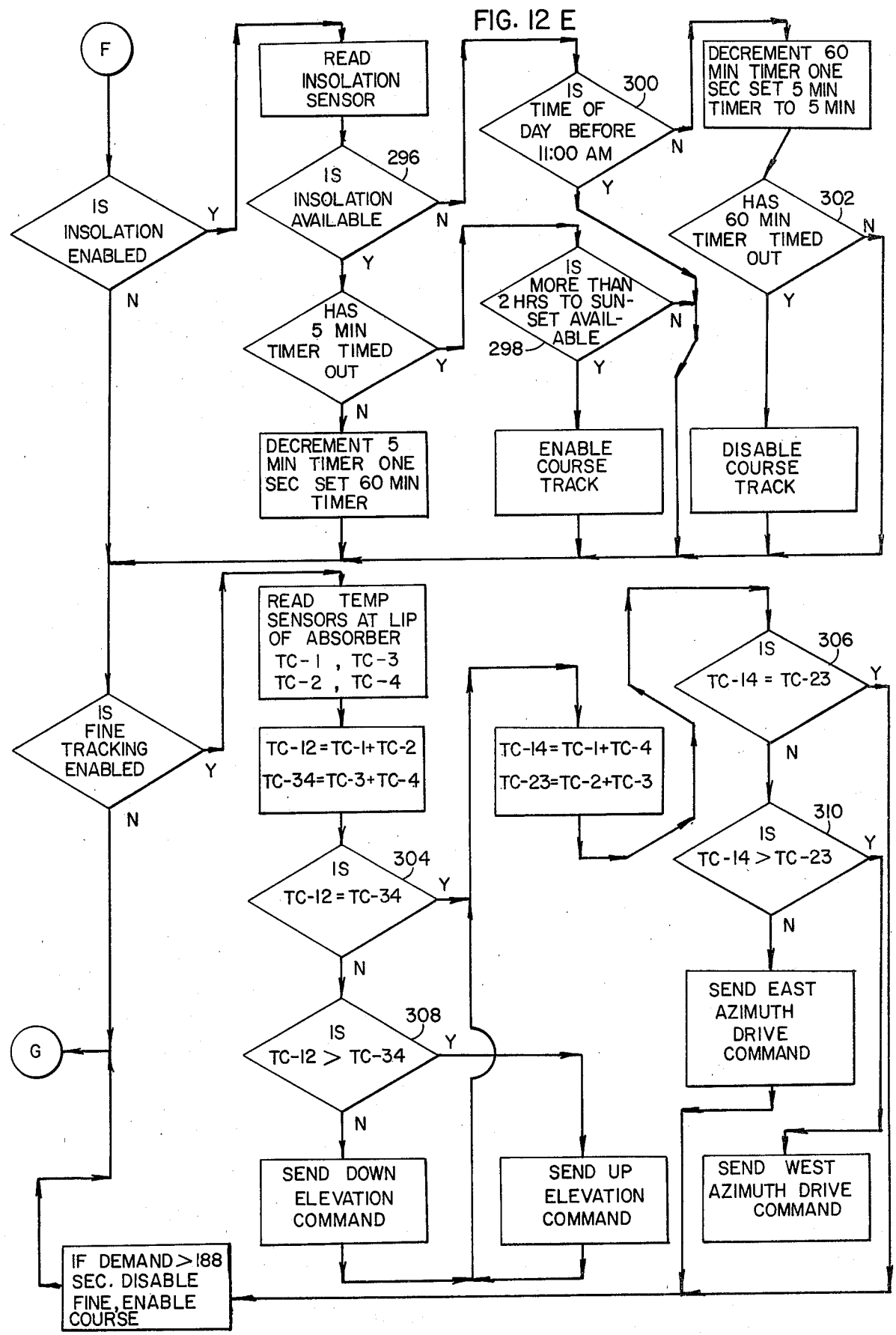

SOLAR COLLECTION SYSTEM

BACKGROUND OF THE INVENTION

This invention relates to collecting and absorbing high concentrations of solar energy for heating a working fluid and more particularly to a concentrating solar collector having dual axis sun tracking apparatus controllably driven to obtain optimum focus of the sun's radiation and driven into a stow position when darkness or certain weather conditions prevail.

Although many attempts have been made in the prior art to collect and concentrate the electromagnetic waves of the solar spectrum and to utilize the energy for thermal applications, the known systems have not proven to be economically feasible. To concentrate and recover the large amounts of energy required for most practical applications it is necessary to provide collectors having reflective surfaces in the order of at least 30 feet. The structural requirements of such large units present weight and cost programs that have not yielded ready solutions. In Brantley U.S. Pat. No. 4,033,676 a deformable bag enclosure is carried between a pair of spaced hoop members connected together by a number of struts and a reflective surface coextensive with the upper hoop deforms to the desired configuration when a partial vacuum is drawn between the reflective surface and the enclosure. This construction, although providing an inexpensive light weight collector apparatus, is limited to small size applications because of the structural stability of the unit and since the depth of the reflector is substantial relative to the diameter. Moreover, because there is no rear backing structure, a collector of that construction cannot be utilized in applications where rear mounted structure is required as, for example, where azimuth/elevation tracking drives are utilized.

Another limitation of the known prior art solar collector systems is the absorber which traps the reflected energy for heating the working fluid. Most of the known prior art solar energy absorbers or traps are of the transparent cover type units which have a high degree of radiation and convective loss. In Brantley U.S. Pat. No. 3,958,553 an absorber having a light pipe configuration is disclosed which works quite well for high temperature application in the range of 500° to 1000° F. It however utilizes a fluid flowing down the side walls to cool the walls to create a temperature gradient from the mouth to the high temperature section, and requires a relatively large length to diameter ratio.

For lower temperature applications an anti-radiating absorber having a honeycomb structure is more economically feasible. This type of absorber comprises a bundle of parallel very small diameter glass tubes within a cylindrical body, the cylinder having an inner surface of low absorptivity and high emissivity, and the tubes being transparent to solar rays and a high emissivity to thermic rays. Incoming solar radiation passes partly through the walls of the tubes and is partly reflected to the boiler which is perpendicular to the tube axes. The reradiation from the hot boiler is absorbed by the walls of the tubes, which upon heating radiates energy in all directions and the boiler recovers a portion of this energy. However, the known absorbers using this principle have in the past been of complicated configurations and economically unfeasible for practical applications. In the known absorbers the tubes were of long lengths and had extremely small diameters. The tubes were banded together and held in place by an annular-ring member.

Further limitations of the known prior art collectors are their inability to acurately trace and follow the sun, thereby resulting in failure of the reflector to optimumly focus the rays on the absorber with resultant loss of efficiency. Moreover, the known prior systems must be activated daily and manually shut down when solar insolation is limited and when weather conditions are critical.

SUMMARY OF THE INVENTION

The present invention provides an effective economically feasible solar energy system for collecting the available solar energy at a given geographical location and transferring a substantial amount of this energy to a working fluid of a closed loop thermal transport system for transferring the thermal energy to equipment in an industrial process. The system is automated to obtain the optimum available solar insolation and to convert the solar energy into usuable thermal energy.

Generally, the invention includes a reflector having a thin film deformable into a desired concave shape by a pressure differential across the film which is positioned on the front side of a structural dish and made vacuum tight by a heavier membrane positioned on the back of the structure. The reflector is driven by a two axis tracking mechanism directed by controls including a microprocessor programmed with data providing the position of the sun during the course of each day, the reflected rays being focused into an absorber through which the working fluid circulates and which has a low radiation loss tube matrix design.

One aspect of the invention is the pressure supported reflector which is constructed of a frame comprising structural members secured to supports driven about a horizontal axis to provide the elevational position and driven about a vertical axis to provide the azimuth position as it tracks the sun. The structural members form a number of trusses to provide a rigid frame and the membranes are positioned about and sandwich the frame therebetween. The rear membrane covers the rear and sides of the frame while the reflective coating membrane is positioned over the front rim and form by the vacuum applied to the space between the membranes. The tracking controls include a microprocessor programmed with a solar clock and calendar to provide course tracking and an optimizing fine tracking system directed by radiation or temperature detectors so as to finely focus the reflected rays upon the absorber.

Another aspect of the invention is the system of safety and efficiency interrupts incorporated into the controls. The reflector is placed into or remains in a stowed position if, for example, the wind is above a given design value. Moreover, it remains in the stow position if the amount of solar insolation is insufficient to warrant the expenditure of energy for tracking. Similarly, other system operating parameters are monitored to determine if tracking should proceed or whether stow should be ordered.

The absorber of the present invention provides a plurality of relatively large diameter tubes mounted within a housing with a heat exchanger plate at one end of the tubes and the other end of the tubes disposed in a direction facing the reflector. The tubes are supported from the plate by rods carried by the plate and trap a bead at the end of the tubes. The rods extend in rows to carry a number of the tubes.

A further aspect of the invention is the fine tracking system by which the heat at various locations about the mouth of the absorber are measured, compared and equalized. If the temperature at the various locations are unequal, the reflector position is varied until the temperatures balance, thereby directing the reflected rays into the center of the absorber.

Consequently, it is a primary object of the present invention to provide an effective solar energy collector driven to track the position of the sun when sufficient insolation is available.

It is another object of the present invention to provide a reflector for a solar collector having a rigid structural frame covered by a thin covering and a thin resilient reflective surface, the reflective surface being shaped and supported by evacuation of the pressure within the reflector.

It is a further object of the present invention to provide a control system for a solar collector for controllably driving the collector in accordance with a program incorporating the position of the sun relative to the time of day, and the daily time of sun-rise and sun-set.

It is a still further object of the present invention to provide a solar collector controllably driven into a stow position when solar insolation is insufficient to warrant solar tracking and/or when wind conditions are excessive.

It is a yet further object of the present invention to provide a solar energy absorber for a collector comprising a tube matrix within an annular housing having one end directed to receive the rays from the solar reflector and the other end supported at a heat exchanger, the tubes being supported in hanging disposition from the heat exchanger.

It is still another object of the present invention to provide a solar reflector driven to receive the rays of the sun and which includes an absorber for receiving rays reflected from the reflector, the absorber having means for monitoring the inlet temperature for controlling the reflector drive to focus the reflected rays within the absorber.

BRIEF DESCRIPTION OF THE DRAWINGS

The particular features and advantages of the invention as well as other objects will become apparent from the following description taken in connection with the following drawings, in which:

FIG. 3 is a cross sectional view taken through the outer hoop of the reflector depicting the mounting of the reflective membrane and the covering material;

FIG. 4 is a perspective view illustrating the elevational drive assembly;

FIG. 9 is a schematic view of the reflector surface control system;

DESCRIPTION OF THE PREFERRED EMBODIMENT

Figure 1:
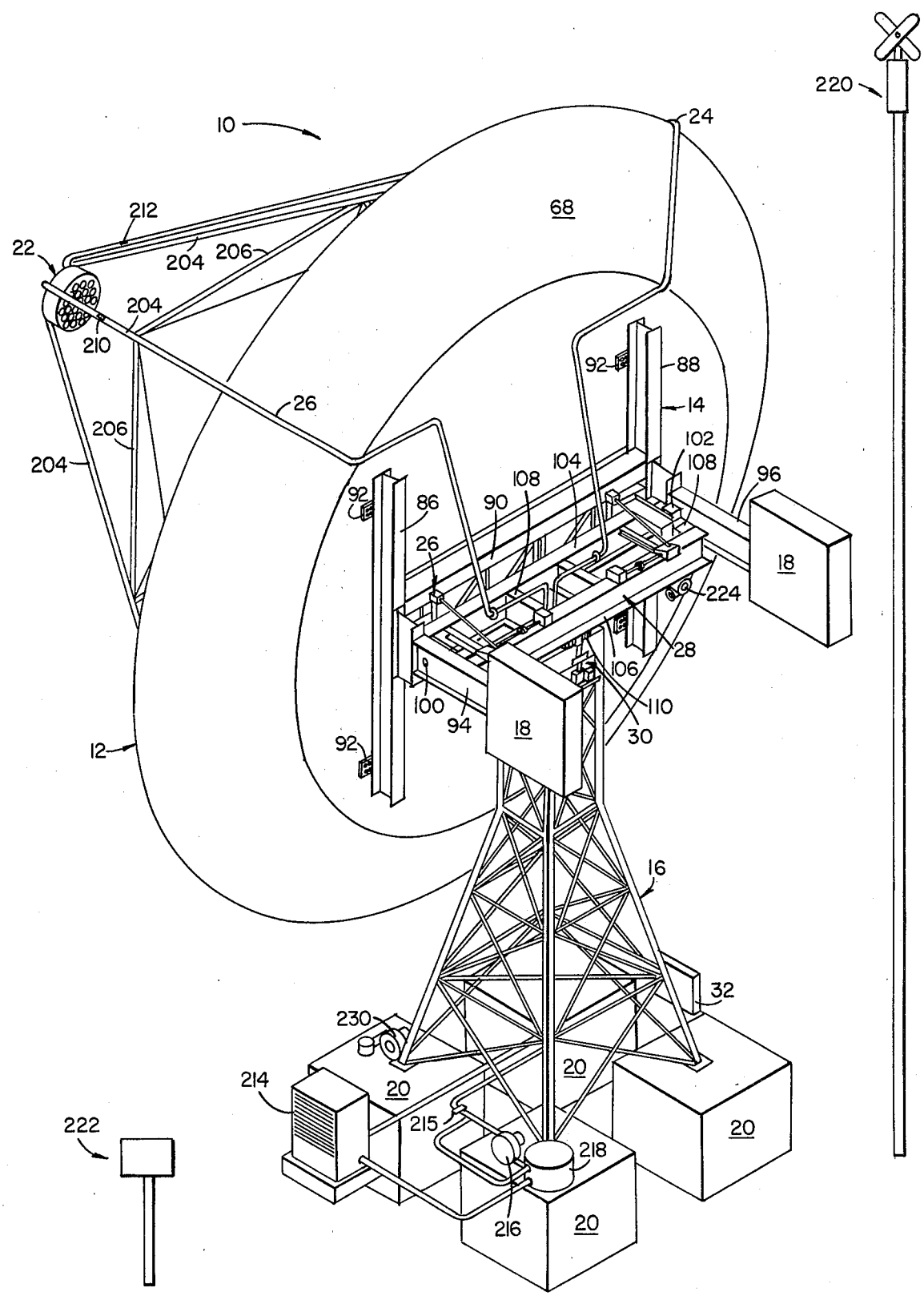
FIG. 1 is a perspective view of the assembled collector unit.

Referring now to the drawings, FIG. 1 illustrates the concentrating collector unit generally indicated at 10. The unit essentially comprises a collector/reflector assembly 12 supported by a dual axis driveable frame 14 carried on a structural support tower 16 and counter balanced by weights 18 mounted on a foundation comprising pads 20. An energy absorber 22 is mounted at the focal point of the reflector for receiving solar energy reflected by the reflector 12 and for recovering and transferring this energy into thermal energy to a working fluid flowing through conduits 24 and 26. The collector support frame 14 is driven about a horizontal axis through a pair of elevational drives 28 and about a vertical axis through an azimuth drive 30. The control for the unit may be mounted in a panel 32 carried by the tower 16 for purposes hereinafter described.

Figures 2, 13:
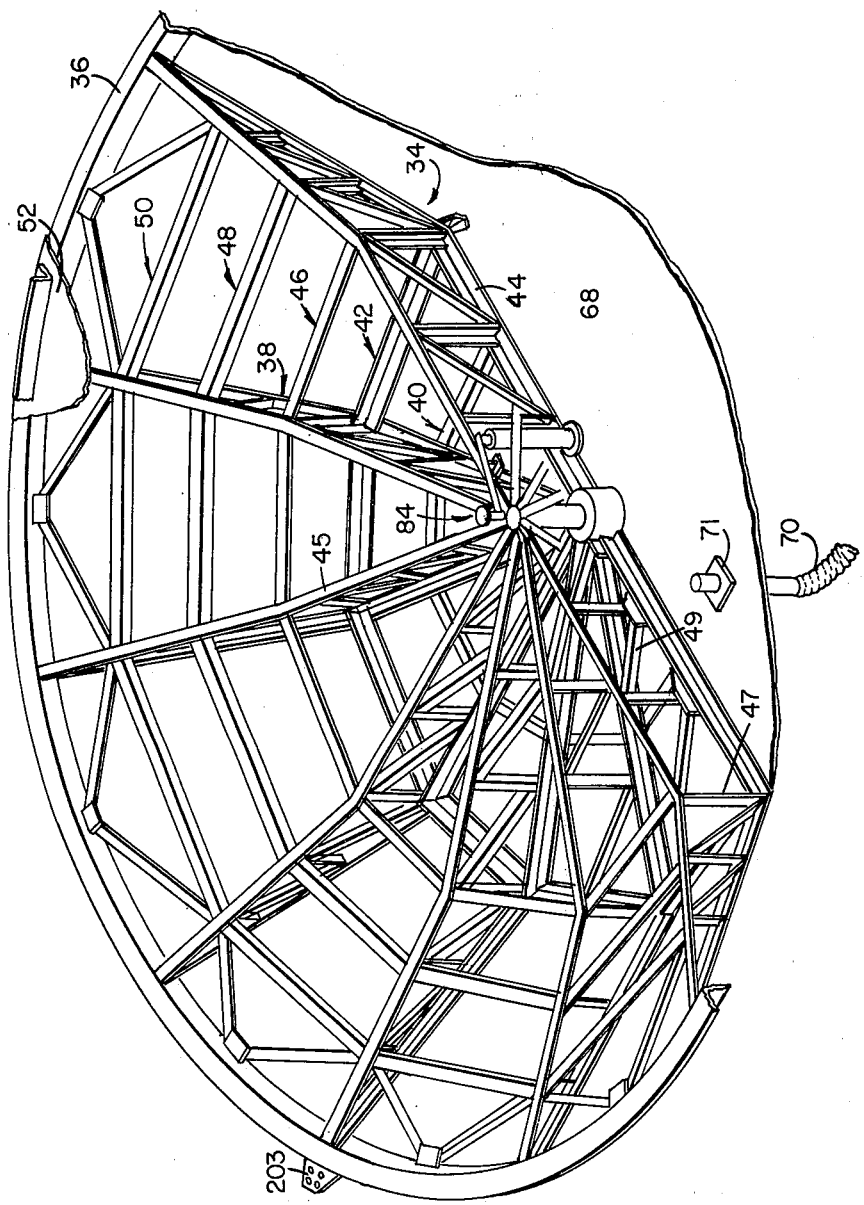
FIG. 2 is a fragmentary perspective view of the reflector dish illustrating the construction of the frame.
FIG. 13 is a flow diagram legend of FIGS. 12(a) through 12(f).
Figure 5:
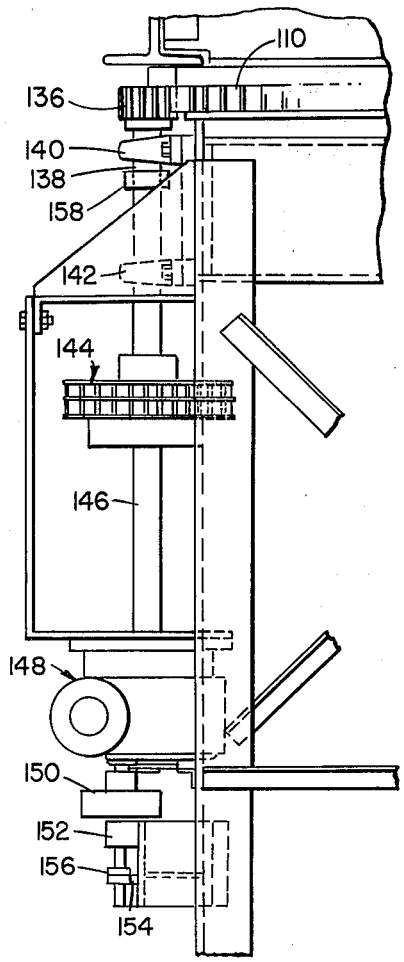
FIG. 5 is an elevational view of the azimuth drive assembly.
Figure 6:
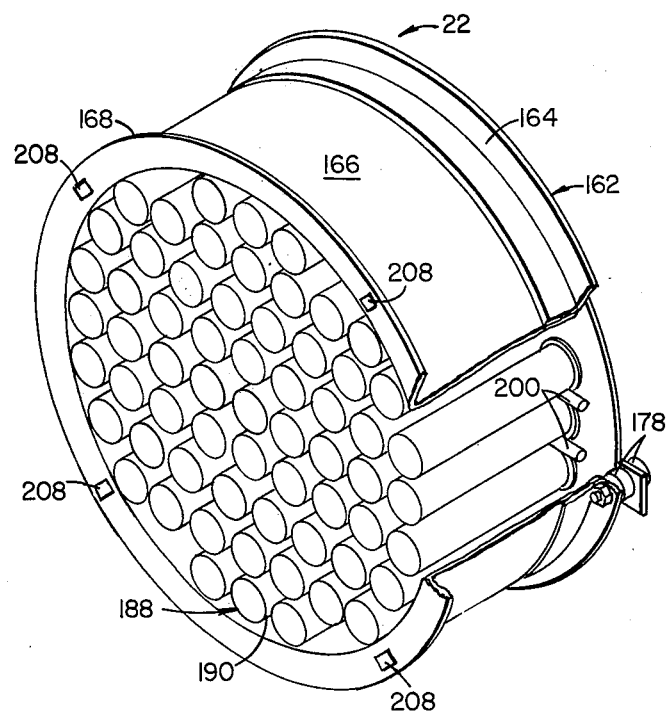
FIG. 6 is a perspective view of the absorber.
Figure 8:
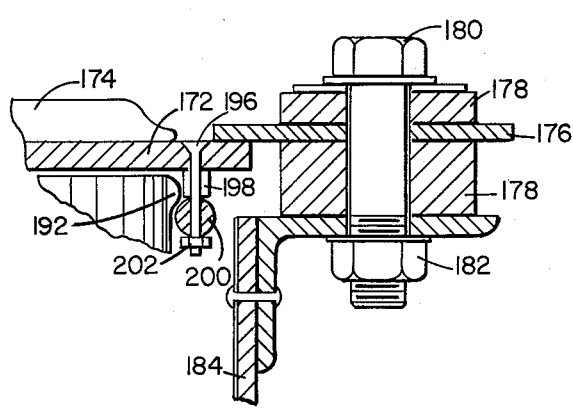
FIG. 8 is a cross sectional view taken through the outer lip of the absorber substantially along line 8—8 of FIG. 6.
Figure 7:
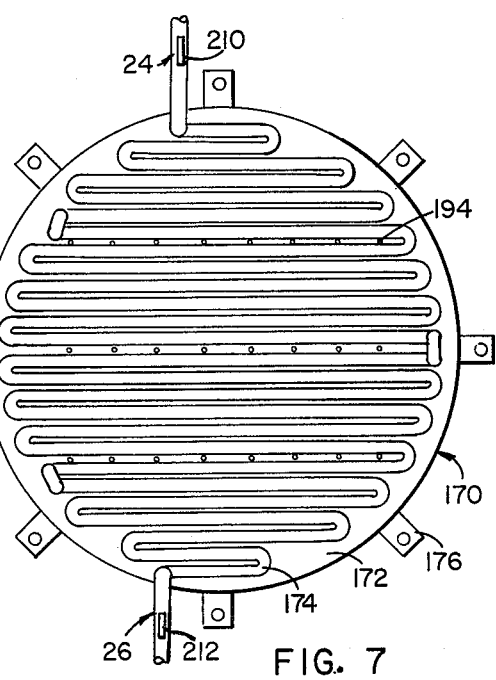
FIG. 7 is a rear elevational view looking into the rear of the absorber illustrating the heat exchange plate.

With reference to FIG. 2, the reflector 12 is substantially dish-shaped having an internal frame 34 comprising a plurality of structural truss members preferably of steel fastened as by welding together into a substantial dish-shaped configuration. With the exception of the sun facing outer front ring or hoop member 36 which preferably is an arcuately shaped angle member formed into a circular ring, the remaining structural elements may be straight angle members assembled to form a number of trusses 38 extending from the rear or small diameter of the dish to the outer ring member 36 and forming the sides of the frame and the internal wall structure. The rear wall structure comprises lengths of angle members fastened together to form a pair of concentric rings 40, 42 connected together by spoke-like members 44. Positioned forwardly of the rear rings are similar concentric rings 46, 48 and 50, connected to the forward most members of the trusses 38 and to at least the rear ring 42. A plurality of spoke-like beams 45 extend from the center of the frame aligned with and spaced forwardly of the spokes 44 and are secured to the ring 46 and by cross beams 47 and 49 to the respective member 44 to form a series of rectangular trusses. All the members are bolted or welded together so that the frame comprises a structurally integral rigid body developing its strength from the truss construction. These trusses are formed by a series of triangles and trapezoids, there being approximately 12 such triangles extending from a central hub at the rear wall and forming each of the rings 40 and 42 and a like number of trapezoids interconnecting and forming the other rings in the 50 foot reflector illustrated, but this number can be varied in accordance with the application size requirements.

The large diameter side of the dish, that which faces the sun, is covered with a reflecting thin film or membrane 52 of aluminized polyester fabric. A four mil thick UV protected reflecting member such as a laminated membrane manufactured by Martin Processing Company of Martinsville, Va. has been found to provide desirable results for this cover. The film, which rolls on a flat surface, can be assembled to the appropriate diameter with parallel seams and assembled with a pressure sensitive tape having a silicone adhesive. The membrane can be shipped to the collector installation site rolled on dowels or folded and is then sandwiched between a pair of soft elastic gaskets 54, 56 such as soft rubber and together assembled by clamping them to the hoop 36. The clamping may be made by bonding with a glue and weatherized overcoat, or may be bolted with bolts 58 as illustrated. The first gasket 54 is first glued to the hoop 36 as the inner edge thereof and a double backed adhesive is placed thereon without removing the upper transfer backing. The membrane is then stretched out over the transfer backing and spring clips or straps are attached to gromnets formed about the periphery of the membrane as an installation aid, and the clips or straps are attached to the outer edge of the hoop 36 to hold the membrane wrinkle free until it is installed. The transfer backing is thereafter removed and a second double backed adhesive is applied to the upper surface of the membrane and the second gasket 56 is positioned thereon. An angle member 64 is then placed on the gasket 56 and secured by a plurality of spaced angular clamping plates 66 positioned with one leg on the hoop 36 and the other leg on the outwardly facing leg of the angle member 64, the bolts 58 passing through the clamping plates 66 and the hoop 36.

The rear and side of the frame are covered with a vinyl impregnated nylon dacron or polyester backing 68. This covering is cut to shape and bonded with glue to the outer structural frame members at the contact points. For purposes hereinafter described, the backing 68 is formed with a tube 70 extending therethrough, a flange 71 is formed on the end of the tube within the dish and bonded to the backing so that the tube cannot be removed. The peripheral edge of the backing is bifurcated in that a second ply of material is bonded a few inches from the edge. One ply 72 is bonded to the downwardly depending leg of the hoop 36 and the other ply 74 includes a grommet 76 through which one end of a spring 78 is positioned. The other end of the spring is attached to a retaining clip 80 having a hook portion 82 which is latched about the outer periphery of the hoop 36 for reducing the stresses on the bond.

The configuration of the reflector is concave but variable, depending basically on the position of the center of the film with respect to the contact point with the hoop 36. A position switch 84 is located on the internal frame 34 at approximately the center of the reflector membrane for controlling the vacuum pump from the interior of the dish through the tube 70 as further explained hereinafter.

The frame 14 comprises a pair of spaced I-beams 86 and 88 connected together by structural spanning members 90 bolted or welded to the I-beams. Each of the I-beams is fastened to a pair of spaced plates 92 which in turn are bolted by a series of bolts to the internal structural frame members at the back of the dish. An arm 94, 96 is fastened as by bolting to the rear of a respective I-beam 86, 88 and carries one of the counter weights 18 at its free end. Each of the arms 94, 96 carries a pivot pin 100 journally supported in a bearing within a pillow block 102 secured to a box like frame comprising a pair of spaced beams 104 and 106 connected together by spaced bridging members 108 at their ends and at spaced intermediate points. Fastened to the beams 104, 106 and to the central spanning members 108 is the outer race of a ball bearing, the outer periphery of the outer race having a multiplicity of gear teeth 110 formed thereon. The inner race of the ball bearing is fastened to the top of the tower 16 so that the outer race together with the box structure comprising the beams 104, 106 are rotatable about a vertical axis relatively to the tower. Thus, not only is the dish rotatable about the vertical axis together with the box like frame, but is rotatable about a horizontal axis on the pins 100 relatively to the box like structure and the tower.

To drive the dish elevationally about the horizontal axis a pair of screw jack assemblies 112 are pivotably mounted at spaced locations on the beam 106 and the output ends 114 of the screw jack are pivotably fastened to the beam 90. The input to the screw jack is to a worm 116 forming part of the screw jack assembly which has a sprocket member 118 fastened on its free end. A second sprocket 120 drivingly connected to the sprocket 118 by a chain 122 is mounted on one end of a shaft 124 journalled in spaced bearings 126, 128. For convenience the sprockets may be mounted between these bearings. The other end of the shaft 124 is fastened to the output of a magnetic clutch assembly 130. A rotary hydraulic actuator 132 drivingly rotates the clutch 130. The direction of rotation in which the clutch drives is determined by one of two relays receiving command signals from the control system hereinafter described. The hydraulic actuator 132 receives fluid from a hydraulic valve at one side thereof to rotate the actuator its full 360° cycle at which time the fluid is directed to the other side to return the actuator to its original position. Limit switches are used for each actuator at each end of the cycle. The units cannot index until they have completed the cycle. Completion of the advance stroke closes the appropriate limit switch which starts the return stroke, the limit switches and the switch actuators being indicated generally at 134.

To obtain the azimuth position the gear 110 meshes with a small pinion 136 fastened to a shaft 138 supported vertically in a pair of bearings in pillow blocks 140, 142 secured to the tower 16. The other end of the shaft 138 is attached to one part of a torque limiting clutch 144 having its other operative part connected to a second shaft 146 extending downwardly therefrom and which is fastened to the output end of a gear reducer 148. The input to the gear reducer 148 is applied by a magnetic clutch 150 drivingly connected to a hydraulic rotary actuator 152 similar to the actuators 132 of the elevational drive assembly. Limit switches 154 are actuated by limit switch actuators 156 on the rotary actuator to signal each end of the actuation cycle and the unit cannot index again unless it has completed the cycle. Completion of the advanced stroke closes the appropriate limit switch starting the return stroke, the signals for actuation being supplied to the actuator by the microprocessor which also supplys a direction signal to the magnetic clutch in a similar manner to the elevational drive system. Potentiometers 158, 160 are located on each of the azimuth and elevation drives respectively to feed back the collector position information to the microprocessor. A hydraulic pump 230 at the base of the collector tower supplies hydraulic fluid under appropriate pressure for the actuators 132, 152. It should be understood that the elevational and azimuth drive systems described are for purposes of disclosure and that other conventional drive systems such as a servo drive or a high torque electrical motor drive may be used instead.

The absorber 22 comprises a substantially cylindrical housing 162 having a flared lip or rim 164 which may be formed by welding an L-shaped hoop member to a cylindrical ring 166. Similarly a lip 168 may be formed at the front or reflector facing end of the ring 166. Positioned at the end of the housing, i.e. at the end furthest from the reflector, is a heat exchanger 170 which comprises a substantially flat stainless steel backing plate 172 to which a coil plate having a continuous coil 174 serpentined over the surface is welded. The backing plate 172 includes a plurality of ears 176 secured to and extending radially from the periphery at spaced locations. The ears 176 are bolted to the rim 164 of the cylindrical housing 162 to secure the heat exchanger thereto. Insulation material 178 is positioned on both sides of each ear and a cap screw 180 extends through the insulation, ear and rim and secured by a nut 182. The inside of the cylindrical housing has a surface to which a sheet of radiation reflecting material 184 such as ALZAK marketed by the Aluminum Company of America is secured as by a rivot 186. This material is highly reflective and has a low absorptivity and high emissivity in the visible portion of the electromagnetic radiation spectrum, and a low absorbtivity for the infrared portion to reflect incoming radiation to the heat exchange back plate.

Supported within the absorber housing cylinder is a tube matrix 188 comprising a plurality of Pyrex glass tubes 190 disposed side by side in rows across the housing. In the form as presently constructed the tubes have a nominal diameter of four inches and are 12 inches in length. One end, that being the end furthest from the reflector, is beaded at 192, the bead having a diameter of between 5/32nd and 7/32nd inch radius. The backing plate 172 of the heat exchanger 170 has a plurality of drilled holes 194 for receiving a fastener such as screw 196. The screw passes through a rod 198 positioned against the plate 172 and through an elongated cylindrical steel bar 200. The bars 200 which are approximately 9/16th inch in diameter extend in rows and catch or trap the beaded lip 192 of each tube 190 on each side of the row so that each rod traps the lips of the tube of contiguous rows. A nut 202 secures the bar in place and since each tube has diametrically opposed portions of the beaded lip supported by the bar, the tubes are thusly secured against axial movement and are thereby secured in position within the cylindrical housing 162.

The inside of the backing plate 172 facing the concentrated solar radiation of the reflector is coated with a highly absorbant oxide finish and has an absorptivity of approximately 88% to 90% and a low emissivity. The tube matrix directs the incoming radiation to the absorber back plate surface and reduces re-radiation and convective losses from the back plate surface. The re-radiation from the heat exchanger back plate is absorbed by the walls of the tubes and radiates a substantial amount of this energy back to the heat exchanger. Moreover, since the cylinder has an inside surface of high emissivity the absorber design is such as to maximize the amount of energy transferred to the heat exchanger and thus to the working fluid flowing through the coil 174.

The absorber cylinder 162 is secured to the reflector 12 by means of four tubular rods 204 equally spaced about the absorber and secured as by bolting thereto at one end and which are secured as by bolting at their other ends to a bracket 203 outstanding from the rim 36 of the reflector. Additional support may be provided to the tubes 204 by bracing members 206 extending between each pair of tubes 204. Two of the tubes 204 may respectively comprise or carry the conduits 24 and 26 through which the working fluid flows to and from the heat exchanger. Positioned about the mouth of the absorber on the rim 168 at the spaced locations substantially 90° apart and preferably at the 45° positions to the horizontal and vertical axes, are four thermocouples 208 which as hereinafter described are used for fine tuning the tracking system so that the temperature indicated by each thermocouple is substantially the same thereby indicating optimal focus of the rays from the reflector into the tube matrix. Two other thermocouples indicated generally at 210 and 212 are respectively located in the fluid conduits 24 and 26 respectively are provided for monitoring the liquid temperature entering and leaving the absorber and is utilized as hereinafter described to regulate the flow through the absorber heat exchanger to maintain the temperature of the outgoing fluid substantially constant and below the design temperature. The hot fluid is conducted to an output heat exchanger 214 which may be mounted at the base of the tower and which transfers the heat of the working fluid to the industrial system or process. An electrically operated flow control valve 215 is mounted in the fluid line in communication with a pump 216 and a reservoir 218 at the base of the tower. The flow control valve is controlled through the microprocessor by the information received from the thermocouples 210, 212 to maintain the constant temperature at the output of the absorber. The flow control valve modulates the flow of fluid as required to maintain the absorber outlet temperature based on the thermocouple reading.

A wind sensor 220 is mounted at a high point preferably away from the tower so as to reduce the effects of the tower, but is illustrated for purposes of space limitations and completeness of disclosure as being mounted adjacent the base of the tower. The wind sensor is of the electrical type and has a voltage output dependent upon the velocity of the wind. The information from the wind sensor is transmitted to the microprocessor and when the winds are above the design value, which may be in the range of approximately 25 to 40 miles per hour, a signal is transmitted to the collector tracking drive systems to move the collector to the stow position. The stow position is with the reflector to be self draining with a partial vacuum and is in the order of 5 to 15 degrees with respect to elevation from the horizontal and preferably at one of three azimuth positions, i.e. east, south or west. The system also includes an isolation monitor in the form of a direct beam discriminator 222 mounted on a post south of the base of the collector. The direct beam discriminator measures specular insolation available and transmits this information to the microprocessor. If sufficient insolation is available the control system initiates the course tracking as hereinafter described. The solar direct beam discriminator scans all portions of the sky where the sun could be at a rate of 60 times per second. A photodarlington output pulse is generated 60 times per second with an amplitude proportional to the direct beam solar component. This output is monitored by the microprocessor to determine if the solar direct component is large enough to warrant solar tracking by the collector. Sufficient insolation is considered available if a shadow can be cast so that the threshold level of the discriminator is approximately 30 Btu/ft$^2$-hr.

Mounted for convenience, as for example, on the beam 106 of the collector support frame 14 is a vacuum pump 224 which communicates with the tube 70 of the backing membrane 68 to draw a slight vacuum in the order of 0.1 psig within the reflector dish thereby deforming the reflective membrane 52 into a segment of a sphere. The radius of the sphere is held within acceptable limits by the position switch 84. The positioning switch 84 is normally closed and opens upon contact by the reflective membrane to open the vacuum pump circuit. A solenoid operated vacuum dump valve 226 is in communication with the pump 224 and the tube 70. The valve is opened when the pump is drawing a vacuum and closes when the desired vacuum is achieved. Pressure switches 228 and 229 electrically communicate with the valve 226 and are positioned on the vacuum dump valve to measure the vacuum within the reflector relative to atmosphere. If for some reason such as temperature and atmosphere pressure changes the pressure within the reflector becomes too low the normally closed pressure switch 228 opens resulting in the vacuum dump valve opening to dump the vacuum. As a safety precaution the vacuum dump valve also opens upon loss of power without the pump being on. Thus, the collector will defocus to prevent damage until correction is achieved. The additional pressure switch 229 is provided to control the partial vacuum at stow.

Collector tracking is initiated at sun-rise when the output signals from the wind sensor 220, insolation monitoring direct-beam discriminator 222, and the reflector film position micro-switch 84, respectively, indicate that the wind velocity is below the approximately 25 to 40 miles per hour (MPH) design value, that there is sufficient solar insolation, and that the reflective film 52 is properly positioned. Thus, the control system checks these signals to determine whether the system should be enabled. The wind sensor 220 output is monitored at least once each minute when the reflector dish 12 is out of the stowed position. If the wind velocity exceeds the design value, the reflector is ordered to one of the three stowed positions, i.e., an east, a south, or a west position. Tracking is not started again for one hour after the wind velocity is less than the design value and then only after the insolation sensor 222 has indicated a sufficient signal.

The signal from the insolation detecting direct-beam discriminator 222 is monitored at least once a minute after sun-rise until five minutes of an adequate component of sunlight is sensed. Course tracking is then initiated. Once tracking has been initiated prior to 1100 hours, the system continues to track until 1200 hours. At 1100 hours the insolation sensor 222 is monitored at least once each minute. Tracking is stopped if there is no course tracking command signal given for 60 consecutive minutes. Tracking is reinitiated and continued for the rest of the afternoon if five minutes of adequate direct component sunlight is sensed prior to two before sun-set. The reflector film position switch 84 has its contacts normally closed (NC) and opens upon engagement with the reflector film. The position of the switch 84 is monitored once a second, and, if closed, the vacuum pump 224 is started. The vacuum pump 224 shuts off when the switch 84 opens, and cannot be restarted until the expiration of at least a one-minute time delay.

If the wind, insolation, and reflector film position sensors provide the necessary signals to initiate operation, the hydraulic pump system is started and the control system initiates operation to move the reflector 12 from the stowed position to the calculated-course pointing position. The actual reflector position is fed-back from the potentiometers 158 and 160 on the azimuth and elevational drive mechanisms, respectively. The absorber 22 temperature is determined by the highest of the two thermocouples 210 and 212 located in the fluid lines and, when a temperature of approximately 200° F. (95° C.) is detected, the fluid circulation pump 216 and heat exchanger motor are started. When a temperature of 400° F. (205° C.) is detected, the control valve 215 is adjusted to control and regulate the absorber outlet temperature to approximately 650° F. (345° C.). If the absorber outlet temperature exceeds approximately 675° F. (355° C.), the control system signals the dump valve 226 to vent the reflector and to provide commands to the tracking system to bring the reflector to the stowed position. Manual reset is then required prior to resuming normal operations. Similarly, if the differential pressure switch 28 indicates a pressure differential of approximately 0.12 psi the vacuum is dumped by operation of the dump valve. The four thermocouples 208 located about the mouth of the absorber 22 are monitored and fine tracking is initiated to balance the values after the absolute temperature of any of the four thermocouples is above approximately 300° F. (150° C.). The system thereafter reverts to course tracking, and fine tracking corrections are not made more frequently than every minute to prevent reflector hunting. At sun-set, the controller 232 provides signals to the collector system to return the system to the normal stowed position and signals to thereafter stop operation of the hydraulic pump and the remaining operations.

Figure 10:
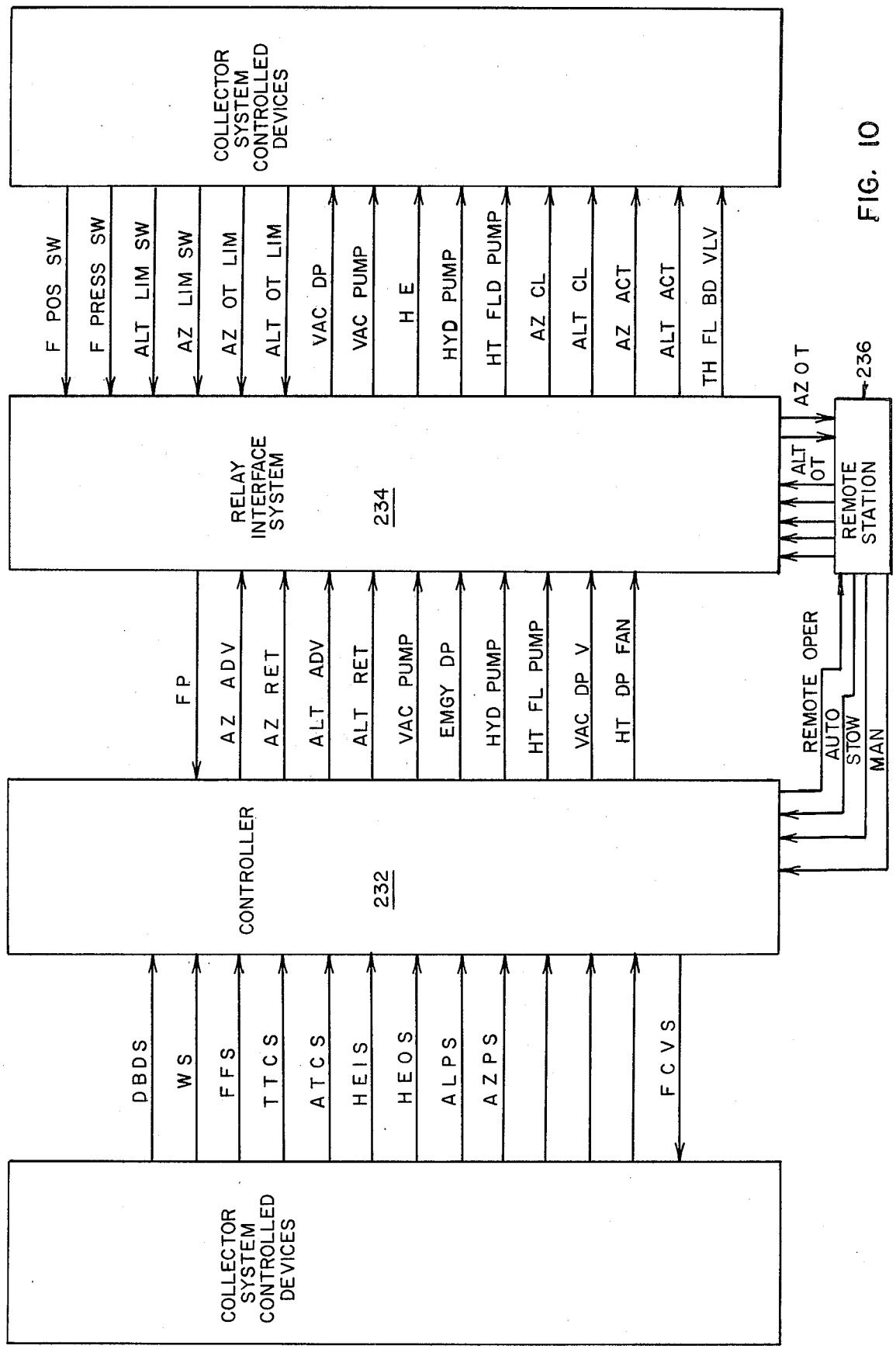
FIG. 10 is a representation of the collector system in block diagram form illustrating the interconnections between the collector, the condition sensors, the controller and the control signals.

As shown in FIG. 10, the power and control signals for operationally driving the collector are disclosed in block diagram form. The control signals enter and are operated upon by the controller 232 and are provided to the collector controlled devices. The power signals enter and leave through a relay interface system 234 which interfaces between the relatively low-voltage controller 232 and the high-voltage controlled devices. A remote control station 236 can override the automated control of the collector by an operator when desired such as in the event of a failure. It can thus be seen that the signal DBDS from the direct-beam discriminator 222, together with the signal WS from the wind sensor 220 and the signals TTCS from the four thermocouples 208 and the position signals ALPS and AZPS from the potentiometers 160 and 158, respectively, are transmitted directly to the controller 232 which also receives signals FFS from a fluid flow meter located between the heat exchanger 214 and the pump 216, and signals HEIS and HEO respectively, in the inlet and outlet of the heat exchanger 214. The controller 232 provides a control system signal FCVS directly to a flow control valve 215 for controlling the flow of the heat transfer fluid through the heat exchanger 214.

The controller 232 also receives signals through the relay interface system 234 from a number of switches including the film position switch 84 (FPOSSW), the film pressure switch 228 (FPRESSW) the altitude and azimuth limit switches 134 and 154, (ALT LIM SW and AZ LIM SW) respectively, and a pair of overtravel limit switches for the altitude drives and an overtravel limit switch for the azimuth drive, respectively, ALT OT LIM and AZ OT LIM. These signals are acted upon by the controller 232 to advance or retract the azimuth and elevational drives if necessary and to turn the vacuum pump 224 on or off as necessary. It also operates to control the hydraulic fluid and the heat transfer fluid pumps, and a vacuum dump valve and heat dump fan along with an emergency dump valve if required. These signals are provided through the interface system 234 to provide control signals AZCL and ALTCL to the azimuth clutch 150 and the altitude clutch 130, respectively, and signals AZ ACT, ALT ACT to the azimuth actuator and to the altitude actuators 152 and 132 respectively. Control signals VAC DP and VAC PUMP are also transmitted from the interface to the vacuum dump valve 226 and the vacuum pump 224 to control the position of the reflector film. Other signals such as HYD PUMP are provided to control the hydraulic pump 230, HF to a heat exchanger fan utilized in an experimental prototype system, and TH FL PRYLV to the thermal flow bleed valve 215. The remote station 236 can override the signals by providing a manual operation and manual stow signal, in which case the elevation and azimuth drive are controlled manually to move the collector to the desired position. Overtravel signals from the overtravel limit switches are fed to the remote station in the event the collector moves beyond the manually controlled positions.

Figure 11:
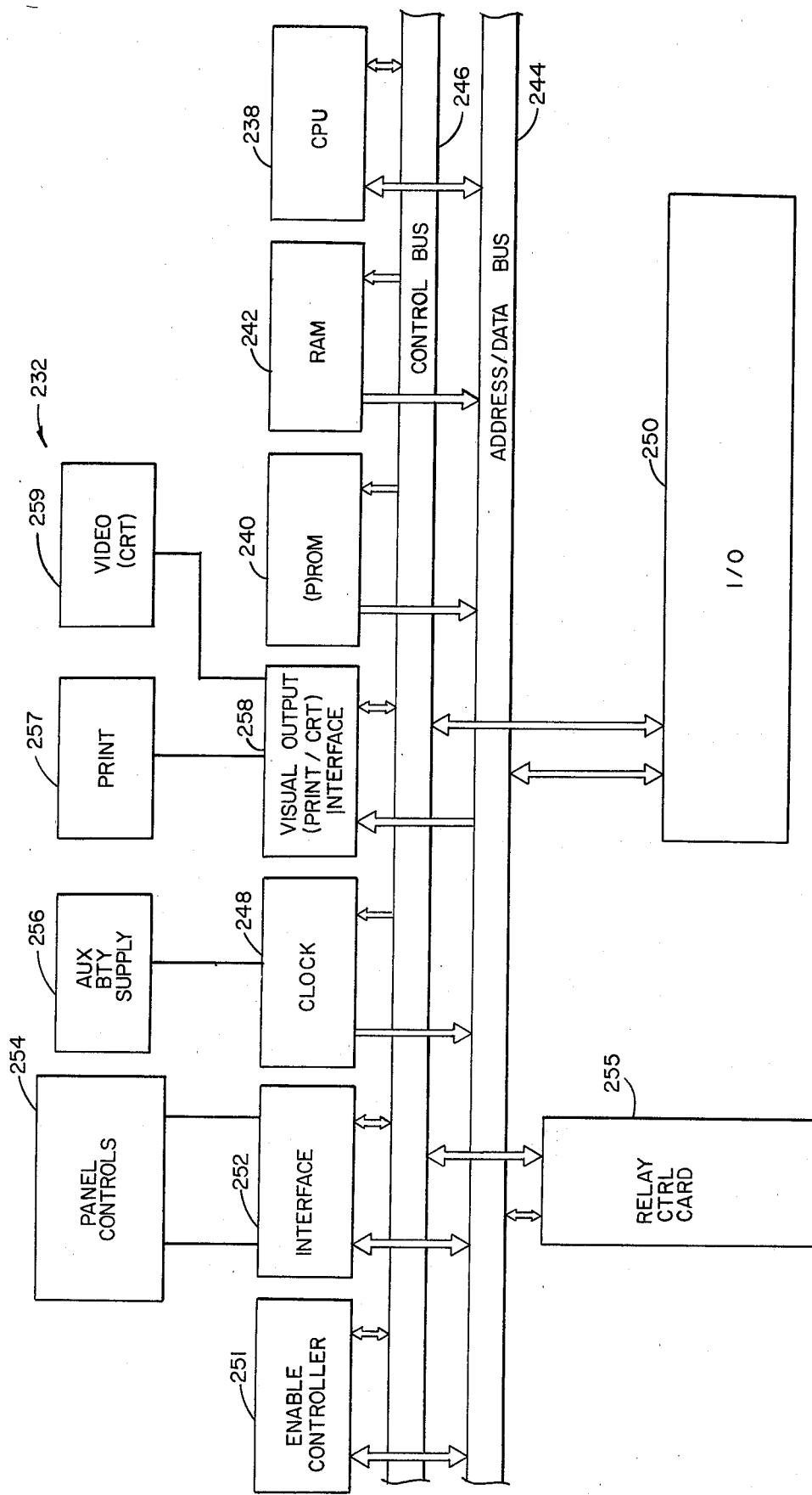
FIG. 11 is a representation in block form of the collector system controller.

The controller 232 of FIG. 10 is shown in schematic block form in FIG. 11 and includes a microprocessor-based central processing unit (CPU) 238 and associated support integrated circuits (IC's) including a permanently encoded read only memory (ROM) 240 and a random access memory (RAM) 242. The central processing unit 238 is connected to its associated memories 240 and 242 and other controlled devices described below through a combined data/address buss 244 and a control buss 246. A 24 hour real-time clock 248 provides the necessary clock pulses to effect coordinated and timed operation of the various devices connected to the busses 244 and 246. The clock is adapted to receive power from a stand-by battery 256 in the event of a power failure. The battery 256 also acts as an auxiliary power source for the various components of the controller 232. Other devices connected to the busses 244 and 246 include an input/output analog/digital (A/D) converter 250, a control panel 254 and associated interface 252, and a relay control card 255 that performs the relay functions shown in FIG. 10 at 234. A printer 257 and associated printer interface 258 may provide hard copy output of the system operation. If preferred, a video display unit (VDU) 259 in the form of a CRT may also be provided.

Figure 12A:
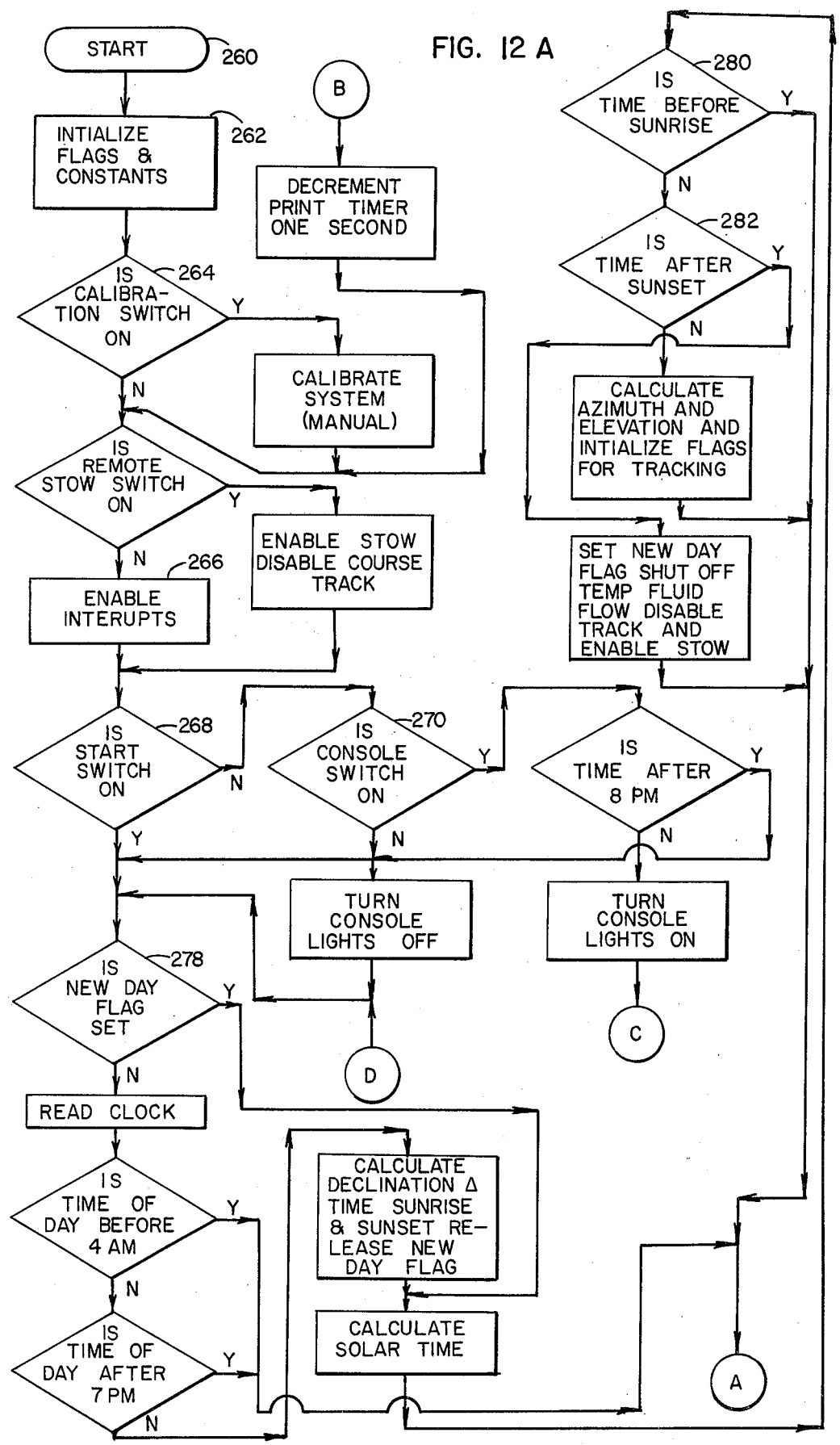
FIGS. 12(a) through 12(f) is a flow diagram for the controller program for directing the collector system.
Figure 12B:
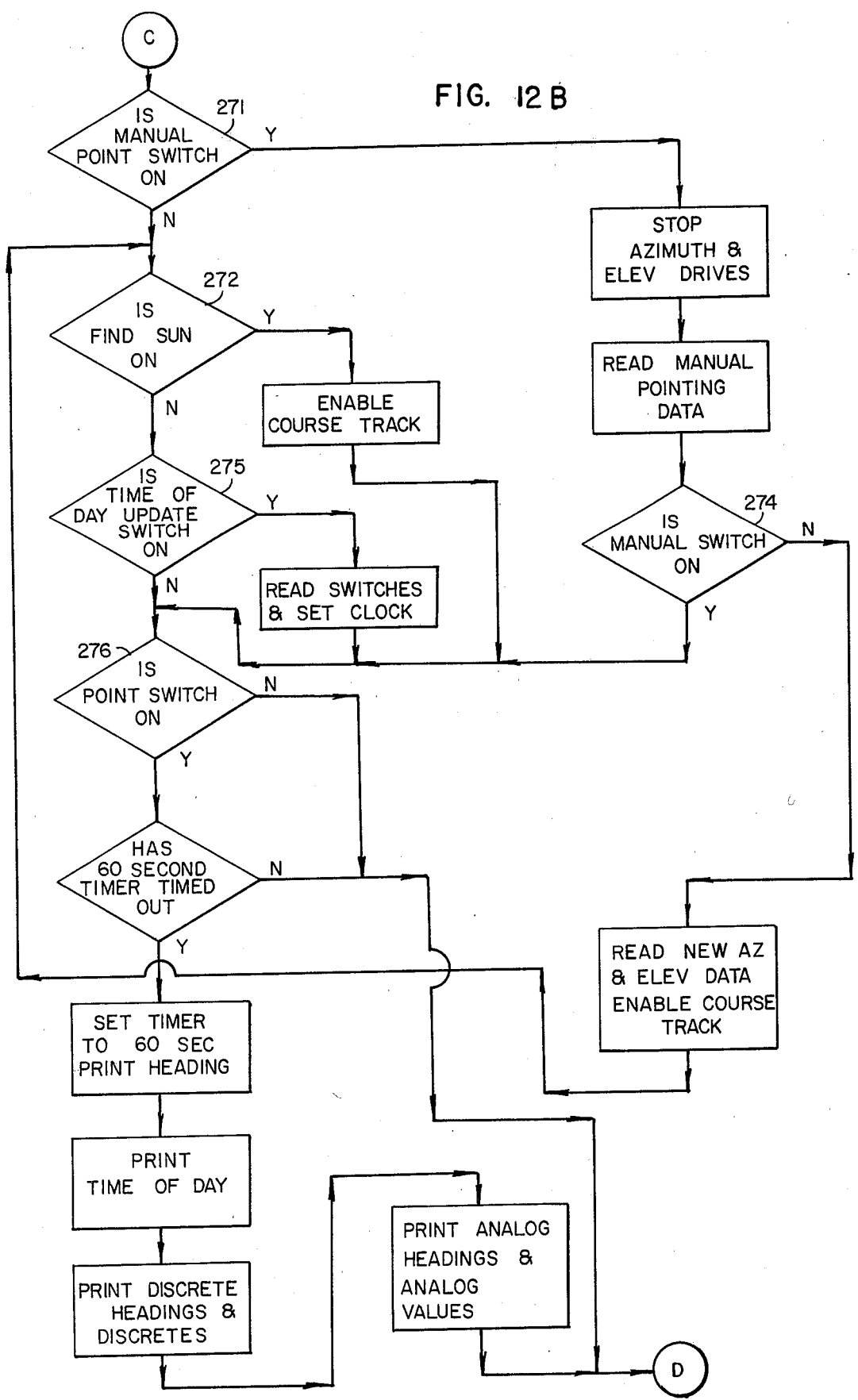
Figure 12C:
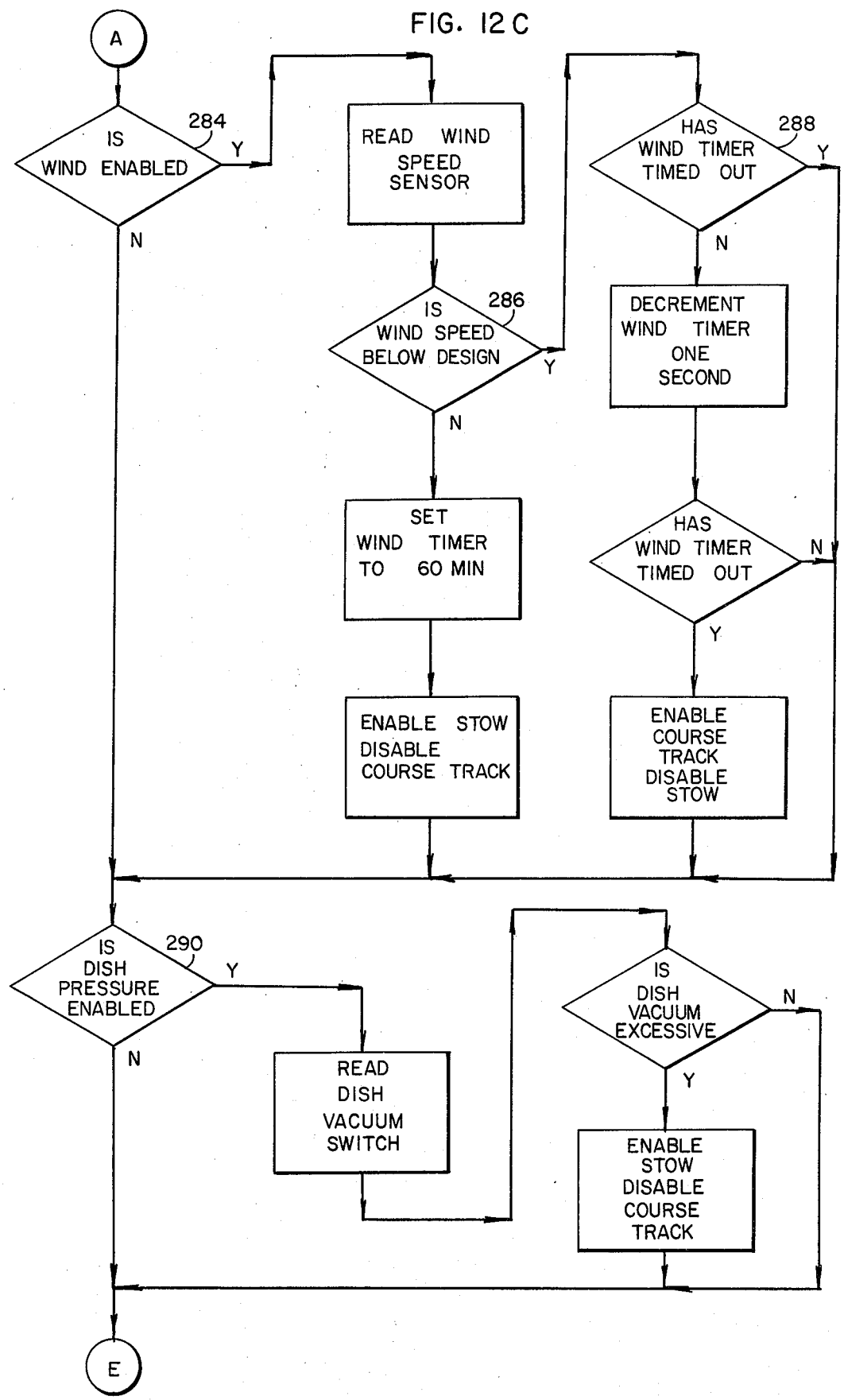
Figure 12:
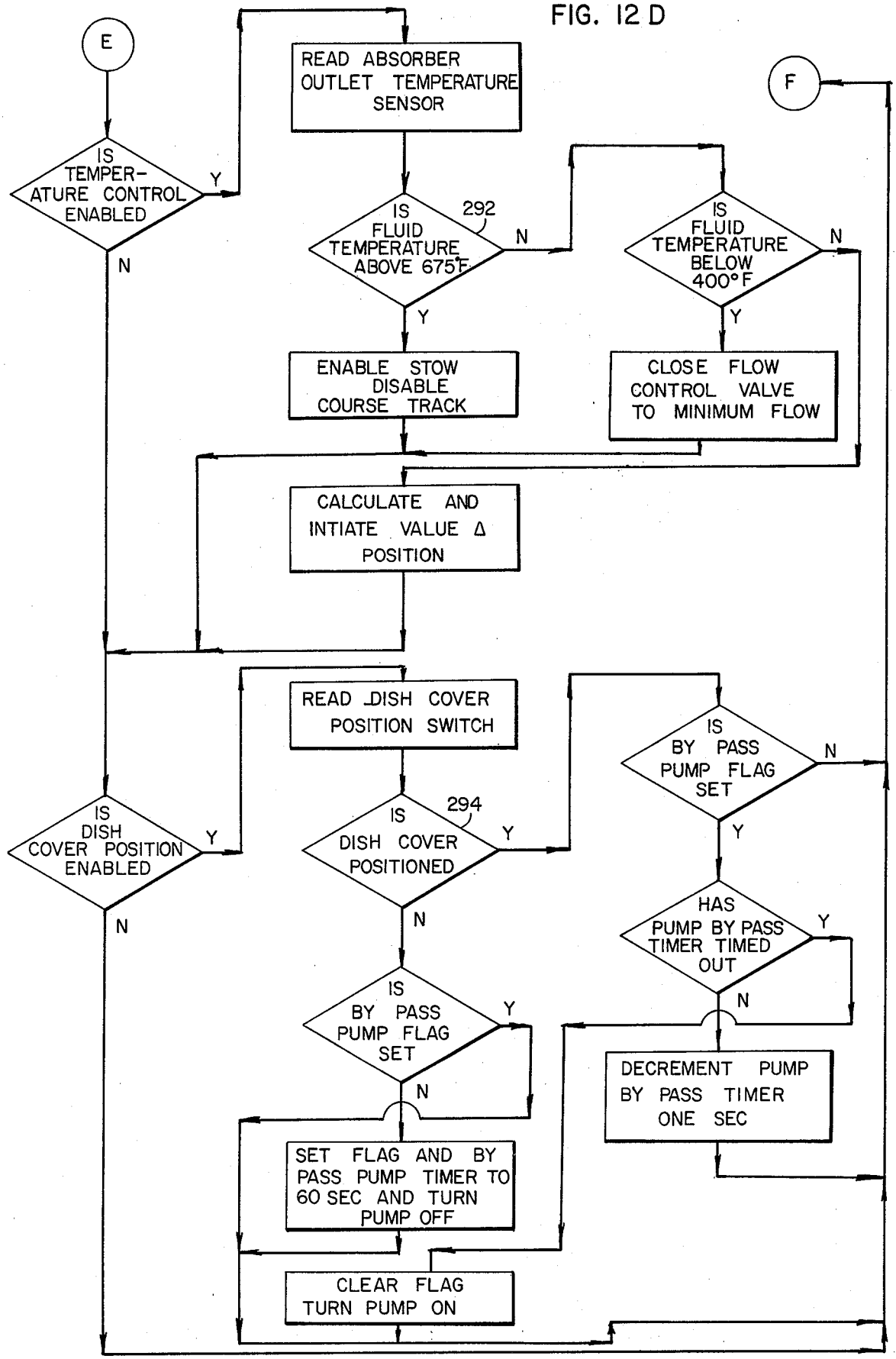
Figure 12:
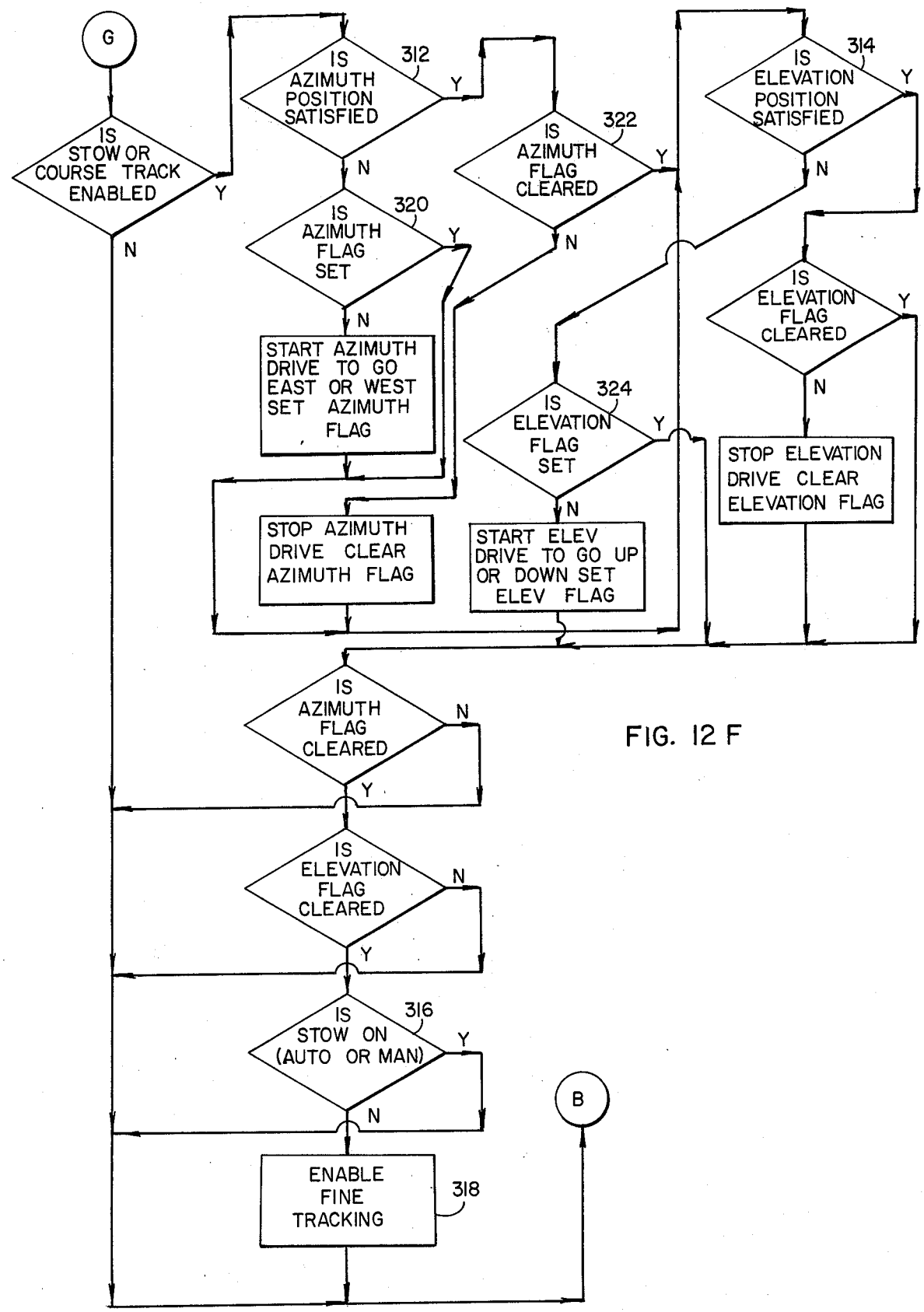

While various microprocessor-based controllers are suitable for the aforedescribed system, the preferred microprocessor controller is a National Semiconductor 5514362-2 controller manufactured by the National Semiconductor Company of Santa Clara, California 95051. This controller operates at a 4 Mhz speed with a typical instruction time of 4.7 micro-seconds. The read only memory 240, which may take the form of a conventional ROM, PROM, EPROM, EAROM, is preferably a National Semiconductor IPC 16C/0018/P memory compatible with the aforedescribed processor's bi-directional data buss and having at least 2K of 16 bit memory locations, 1K of 8 bit memory locations at its upper address locations and a 1 micro-second access time. The information provided in the memory 240 includes the various control functions for effecting overall system operation as described more fully below in connection with FIGS. 12A, B, C, D, E, and F; and the location of the sun, the sunrise time, and sunset time during the course of a year with this information being available from a standard astronomical book, e.g., the Solar Ephemeris. The random access memory (RAM) 244 functions as a working store for information and data generated during system operation and preferably takes the form of a National Semiconductor 5513054/4 memory with 1K of 16 bit static memory and compatible with the aforedescribed control and bi-directional data/address busses 244 and 246. The analog/digital input/output device 250 preferably includes a plurality of high impedence analog inputs (e.g., 14) and a corresponding plurality of binary data outputs (e.g., 8 bit word width). If desired, the various inputs and outputs can be multiplexed to provide additional analog/data converting capabilities for the microprocessor 238.

The printer 257 may take the form of a Centronics printer model No. S-1 which may be used with an RS-232 compatable interface. The interface unit 258 interfaces with the CPU bus and is servicable by software to drive the RS-232. The control signals, e.g. those from the thermocouples 208, the direct-beam discriminator 222, the wind indicator 220, etc. described above are interfaced through the input/output unit 250 to the microprocessor comprising the CPU 238 and the memory units 240 and 242. This information is acted upon in accordance with the program interfacing back out through the input/output module 250 and the relay control card 255 to the relay panel and thence to the controlled devices of the collector.

The program for the system is depicted in FIG. 12A through 12E in flow diagram form as read generally in accordance with the flow diagram map of FIG. 13. These software instructions are stored in the EPROM 240 to self-initialize each day at 0400 hours. The reflector, being in the stowed position during the night, will have to travel to the programmed sun-rise position provided the wind sensor indicates that the wind has been below the design value for at least one hour and that there is enough solar insolation to warrant the tracking of the sun. Thus, at system start 260 the program initializes the internal flags and constants illustrated in the common box 262 in FIG. 12A. Once this occurs, the program next determines whether a manual calibration switch in the control panel is ON or OFF. As illustrated in decision box 264, if the switch is ON then the system is calibrated manually. Once calibration occurs the switch is turned OFF. With the switch OFF, the microprocessor next checks to determine whether stow has been ordered manually by checking whether the remote or manual stow switch is ON. If ON, the course tracking is disabled and stow is enabled to drive the azimuth and elevational drives to the stowed position. This prevents the enabling of the interrupt loops such as the wind loop, temperature control loop, reflector pressure loop, film position loop, insolation loop, and the tracking loops as hereinafter described.

If the remote stow switch is not ON, the microprocessor, as illustrated at 266, enables the interrupt loops. The processor then checks to see if the manual start switch is ON as illustrated at 268. If ON, the console or control panel is inoperative and the processor is ordered to the new-day loop. If the start switch is OFF, a check is made to see if the manual console switch is ON at 270. If OFF the system is driven to the new-day loop. If the console switch is ON, a check is made of the time obtained from the clock 248 and if the time is after 8:00 P.M. the console lights are turned OFF and the new-day loop is entered. If the time is before 8:00 P.M. the console lights are turned ON and the microprocessor checks to determine at 271 whether manual pointing toward the sun has been selected by a manual point switch. If OFF, a check is made to determine whether a track enabling manual switch FIND SUN has been turned ON at 272. If the manual point switch is ON, the azimuth and elevational drives are ordered to stop and the manual pointing data is read and the system is checked to determine whether manual operation has been ordered at 274. If it has not been so ordered, then new azimuth and elevational data are read and the course tracking system is enabled and the computor returns to determine whether the manual FIND SUN switch has been turned on at 272. A determination of whether this manual switch is ON is made, and if ON, course tracking is enabled and a check is then made to determine whether a print switch 276 is ON. If the manual drive switch 274 is on then course tracking is not enabled and the print switch condition is next checked. If the FIND SUN switch is OFF a determination is made as to the position of a manual switch 275 to update the time-of-day, for example, for changes due to a time change because of a change in physical location or due to power outages. If this switch 275 is ON the switches are read and the clock is reset and the system is checked to determine if the printing switch is on at 276. Similarly if the time-of-day update switch is OFF the position of the printing switch is directly checked. If ON, the printing loop, if utilized, is entered and a printout is made. If the print switch is OFF, or after the occurrence of printing if ON, the system returns to the new-day loop to determine whether the new-day flag is set at 278.

If the new-day flag is not set the time of day is determined from the clock and if between 4:00 A.M. and 7:00 P.M. the computor is ordered to calculate the declination and the difference in time between sunrise and sunset at that declination and thereafter release the new-day flag. After this or if the new-day flag has been determined at 278, to have been set, a calculation is made of the actual time of sunset and sunrise. If the time is after sunrise and before sunset as determined at 280 and 282, respectively, the processor calculates the azimuth and elevation of the sun and initializes the flags for tracking. If the time is after sunset the new-day flag is set, the fluid system is shut down, course tracking is disabled, and the stow condition is enabled. If the time is after 7:00 P.M. or before sunrise these latter two commands are by-passed. In each case the interrupt loops are thereafter entered at 284.

The first interrupt loop is the wind loop and the system checks to determine whether this loop has been enabled at 286. If this loop and the subsequent loops are not enabled, i.e. have not been enabled at 266 because the remote stow switch is ON, the processor checks the interrupt loops and returns to decrement the printer by one second and returns to check the console loop. If the interrupt loops are enabled, the wind loop checks to determine whether the wind is below the design value for at least one hour. The wind is monitored at least once a minute when the reflector is away from the stowed position and if the wind exceeds the design value the reflector will go to the closest of the three stowed positions (east, south, or west at the selected elevation) and remain there until the wind has been below the design value for at least one hour.

Thus, the wind speed sensor 220 is read and determined at 286 whether above or below the design value. If above the design value the wind timer is reset for one hour and course tracking is disabled and the stow enabled. If the wind speed is below the design value a determination is made at 288 as to whether the wind timer has timed-out. If it has timed-out everything checks and the next loop is entered. If it hasn't checked out the wind timer is decremented by one second and the wind timer is again checked to determine whether it is timed-out. If it has not timed-out then 60 minutes has not been exhausted since enabling stow and course tracking remains inoperative. If the wind timer has timed-out, stow is disabled and course tracking enabled and a check is next made of the subsequent loops.

The next loop entered is the reflector pressure loop, and, if enabled as determined at 290, the pressure switch 228 is read to determine if it is opened or closed and if opened, the vacuum is excessive. Under these circumstances the vacuum is dumped and course tracking is disabled and stow is enabled to drive the collector to the stowed position, requiring manual restart thereafter. If the vacuum is not excessive, a check is made of the next interrupt loop.

The next loop checked is that of the absorber heat transfer medium temperatures as determined by the thermocouples 210 and 212. If the temperature control is enabled the absorber outlet temperature sensor 210 or 212 is read and a decision is made at 292 to determine if the temperature is above approximately 675° F. (355° C.), in which case course tracking is disabled and stow is enabled. If the temperature is below 675° F. a determination is made as to whether the temperature is below 400° F. (205° C.). If below 400° F. (205° C.) the flow control valve 215 is closed to minimum flow until the temperature has reached 400° F., at which time a calculation and initiation of the valve position is made. The heat transfer medium pump and heat exchanger motor are started when a temperature of 400° F. is detected, the flow control valve is put on automatic control and the absorber outlet temperature is regulated to 650°. When this occurs or if the delay timer has not timed-out the microprocessor next checks the subsequent loop.

The film position loop is next checked, and, if enabled, the micro-switch 84 behind the reflective film is read to determine whether it is opened or closed. When the film contacts the switch the switch opens and the vacuum pump 224 is shut. The switch position is monitored once a second but once the pump is cut off it cannot restart for at least one minute. Thus after the position switch is read, a determination is made at 294 as to whether the film is properly positioned. If it is so positioned, a check is made to determine whether the pump closing flag is set and, if set, then the pump has been off and the next loop is checked. If the flag has not been set then the flag is set, the pump is turned off and the by-pass timer is set to one minute before exiting the loop. If the reflective film is improperly positioned then a determination is made as to whether the flag is set for by-passing the pump. If not set then the pump is operating and is checked again in one second, If the flag has been set and if the timer has timed-out, the flag is cleared and the pump is turned on before exiting from the loop. If the timer has not timed-out then the timer is decremented by one second and the loop is exited and checked again in one second.

The next loop to be checked is the insolation or payback loop. The direct-beam discriminator 222 is read; if the loop is enabled and a determination is made at 296 as to whether sufficient insolation is available to initiate tracking. Course tracking is initiated when at least 5 minutes of adequate direct component sunlight is sensed between the hours of 0400 and 1700. Once the course tracking sequence is initiated, it continues to keep the reflector pointing at the sun position window as determined by the solar calendar until 1200 hours, provided it is initiated prior to 1100 hours. At 1200 hours, the system will evaluate the insolation and if no 5 minute period of adequate direct component sunlight has been detected within the last 60 minutes, the course tracking sequence will stop and keep the reflector in the 1200 hours position. If a 5 minute period of adequate direct component sunlight is detected after 1000 hours but before 1700 hours, the course tracking sequence will be initiated and will take the reflector to the window determined by the solar calendar and initiate tracking which will continue until sun-set. At 1700 hours the system will monitor the direct beam discriminator and when the absence of sunlight is detected for a 5 minute period, the system will return the reflector to the night-time or stowed position where it will remain until the 0400 hours pre-sunrise sequence starts. Thus, if sufficient solar insolation is available a determination of whether the five minute timer has timed-out is made, and, if timed-out and if more than two hours prior to sun-set is available as determined at 298, course tracking is enabled. If less than two hours is available then course tracking is not enabled. If the five minute timer has not timed-out then the timer is decremented by one second and the 60 second timer is set for one hour. If solar insolation is not available, then a determination is made at 300 as to whether the time of day is before 11:00 A.M., and if it is before 11:00 A.M. tracking is not enabled since energy pay-back is insufficient, but if it is after 11:00 A.M. the 60 minute timer is decremented by one second and the five minute timer is set for five minutes and a determination is thereafter made at 302 as to whether the 60 minute timer has timed-out. If this timer has timed-out then course tracking is disabled.

Next the fine tracking is checked and, if enabled, the thermocouples 208 spaced 90 degrees apart about the absorber mouth are read. A calculation is then made of a first pair of thermocouples and of the second pair of thermocouples. Two of the thermocouples monitor the azimuth and two monitor the elevation of the reflector. These sensors will normally read equal temperatures when the reflected and concentrated energy is focused totally inside the absorber support assembly lip allowing all the sun's rays to reach the absorber heat exchanger back plate 172. The rise in temperature, when read by any of the thermocouples, will indicate that all of the reflected rays are not entering the absorber assembly and will initiate corrective action until all the sensors are again detecting an equal temperature reading. Fine tracking corrections are programmed not to be made more than once a minute to prevent unnecessary oscillation and chatter in the drive system.

Thus, a determination is made at 304 as to whether the sum of the temperatures of a first two of the thermocouples are equal to the temperature of the other two thermocouples, and, if they are, the elevational setting is correct and an addition is made as to the sum of the temperatures of one thermocouple in the first group and a thermocouple from the second group and of the other thermocouples and these two sums are checked at 306 to determined whether this sum is equal, and if equal the azimuth is properly set. If the elevational check does not provide an equalization of the two groups of thermocouples than a determination is made at 308 as to which group is greater and an appropriate command signal is sent to the elevational drive to drive the reflector up or down prior to checking the second grouping of thermocouples at 306. If the second grouping does not indicate an equalization of the temperature sums than a determination is made at 310 as to which grouping is greater and an appropriate command is sent to the azimuth drive systems to drive the azimuth either to the east or to the west as necessary. The reflector is thus driven in a direction opposite to the hotter thermocouple of the pair that monitor each of the elevation and the azimuth so as to produce an equalization of the temperatures. After the corrections are made, or if no correction is required, this loop is exited and a check is made to see if fine tracking was directed for an excessive duration, e.g., 188 seconds before the stow or course tracking loop is checked. If demanded for more than this duration, it indicates that a thermocouple has failed and fine tracking is disabled and course tracking is enabled.

If course tracking has been enabled a check is made at 212 of whether the azimuth position is satisfied, i.e. whether the actual azimuth position as signaled by the potentiometer 158 is equal to that calculated for the location of the sun. If it is then a check is made to determine whether the azimuth flag has been cleared. If the flag has cleared, a determination is made at 314 as to whether the elevation position is satisfied, i.e. whether the actual elevation position measured by the potentiometer 160 is equal to that ordered. If it is, and if the elevation flag has been cleared, the azimuth and elevation flags are again checked and a check is thereafter made at 316 to determine whether stow has been ordered. If stow has not been ordered either automatically or manually and if the reflector is within the solar window as previously determined, then fine tracking is enabled at 318 and the program returns to start at 260 to monitor the system every second.

If the azimuth position as determined at 312 is not equal to that commanded then a check is made as to whether the azimuth flag is set at 320, and if not set, the azimuth drive is initiated to make a correction and thereafter the azimuth flag is set and the elevational position is checked at 314. If the azimuth flag is set then the elevation is checked directly. If the azimuth position has been satisfied but the azimuth flag has not cleared as indicated at 322 then the azimuth drive is stopped and the azimuth flag is cleared prior to determining whether the elevation position has been satisfied. Similarly, if the elevational position has not been satisfied a check is made at 324 to determine whether the elevation flag has been set, and if not set the elevational drive is initiated and the flag is set prior to rechecking whether the flags have been set and whether the stow has been ordered. If the azimuth or elevation flag have been determined to be set at 320 or 324 then fine tracking is not enabled. Thus, fine tracking is not enabled if the azimuth or elevational position ordered is not indicated as satisfied since the reflector is not yet within the solar window.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. A solar energy collection system for receiving and collecting a concentrated supply of available energy from the sun, said system comprising a substantially dish-shaped reflector having a frontal reflective surface for receiving rays of solar energy and convergingly reflecting the rays toward a focal point, an absorber disposed substantially at said focal point for absorbing the rays, a fixed support tower, mounting means for journally mounting said reflector on said tower for rotation about a substantially vertical axis relatively to said tower, means carried by said tower for journally mounting said reflector for pivotable movement about a substantially horizontal axis relatively to said tower, azimuth drive means responsive to an azimuth control signal for rotating said reflector about said vertical axis, altitude drive means responsive to an elevational control signal for pivoting said reflector about said horizontal axis, position responsive means on each of the azimuth and elevational drive means for generating azimuth and elevational position signals corresponding to the disposition of said reflector, solar insolation monitoring means for providing an enabling signal when available insolation is above a predetermined threshold amount, controller means having stored memory data including the azimuth and elevational position of the sun at all times relatively to the geographical location of the reflector for receiving the azimuth and elevational position signals and the enabling signal and for comparing the azimuth and elevational disposition of the reflector with the stored position and for generating said azimuth and elevational control signals, and means for selectively transmitting said control signals to said azimuth and elevational drive means to point said reflector at the sun.

2. A solar energy collection system as recited in claim 1 wherein said means for selectively transmitting said control signals comprises wind monitoring means for generating a wind signal representative of the velocity of the wind at the reflector location, said controller means including means for comparing said wind signal with a preselected value and for generating azimuth and elevational stow signals when said wind signal is above said preselected value, and means for overriding said azimuth and elevational control signals and for transmitting said stow signals to said azimuth and elevational drive means to point said reflector to a stow position.

3. A solar energy collection system as recited in claim 1 wherein said frontal reflective surface is resiliently deformable and said reflector comprises a substantially hollow frame enclosed by means including said frontal reflective surface, means including a pump for evacuating air from the interior of said reflector creating a partial vacuum to deform said frontal surface inwardly, position switch means disposed within the interior of said frame for shutting said pump when contracted by said reflective surface, pressure monitoring means for determining the existence of a preselected excessively low pressure within said reflector, means for venting the interior of said reflector to the exterior thereof upon the existence of said excessively low pressure, said controller including means for generating azimuth and elevational stow signals when said pressure is excessively low, and means for overriding said azimuth and elevational control signals and for transmitting the stow signals to said azimuth and elevational drive means to point said reflector to a stow position.

4. A solar energy collection system as recited in claim 1, including means for measuring the temperature at spaced points about the absorber, said controller comprising means for comparing said temperature and for generating fine tracking azimuth and elevational control signals when said temperatures are not substantially equal, and means for transmitting said fine tracking azimuth and elevational control signals respectively to said azimuth and elevational drive means to point said reflector to a position at which said temperatures are substantially equalized.

* * * * *